United States Patent
Ljung

(10) Patent No.: US 9,980,238 B2
(45) Date of Patent: May 22, 2018

(54) TIMEOUT OF COMMUNICATION RADIO LINK

(71) Applicant: SONY MOBILE COMMUNICATIONS INC., Tokyo (JP)

(72) Inventor: Rickard Ljung, Helsingborg (SE)

(73) Assignee: SONY MOBILE COMMUNICATIONS, INC., Tokyo (JP)

( * ) Notice: Subject to any disclaimer, the term of this patent is extended or adjusted under 35 U.S.C. 154(b) by 134 days.

(21) Appl. No.: 15/004,025

(22) Filed: Jan. 22, 2016

(65) Prior Publication Data
US 2017/0142675 A1    May 18, 2017

Related U.S. Application Data

(63) Continuation of application No. PCT/EP2015/076561, filed on Nov. 13, 2015.

(51) Int. Cl.
*H04W 56/00* (2009.01)
*H04W 76/04* (2009.01)
*H04L 1/18* (2006.01)

(52) U.S. Cl.
CPC ....... *H04W 56/0005* (2013.01); *H04L 1/1825* (2013.01); *H04L 1/1838* (2013.01); *H04L 1/1848* (2013.01); *H04W 76/045* (2013.01)

(58) Field of Classification Search
None
See application file for complete search history.

(56) References Cited

U.S. PATENT DOCUMENTS

| | | | | |
|---|---|---|---|---|
| 2003/0103521 | A1* | 6/2003 | Raphaeli | H04B 3/542 370/445 |
| 2005/0281232 | A1* | 12/2005 | Kim | H04L 1/1887 370/335 |
| 2007/0230337 | A1* | 10/2007 | Igarashi | H04L 1/1848 370/230 |
| 2008/0259964 | A1* | 10/2008 | Tomita | H04L 1/1838 370/501 |
| 2010/0299433 | A1* | 11/2010 | De Boer | H04L 47/14 709/224 |
| 2011/0110343 | A1* | 5/2011 | Venkatachalam | H04W 12/06 370/338 |
| 2013/0265888 | A1* | 10/2013 | Lee | H04L 43/0811 370/252 |

(Continued)

OTHER PUBLICATIONS

'3rd Generation Partnership Project; Technical Specification Group Services and System Aspects; Policy and Charging Control Architecture; Release 13, Sep. 2015.

*Primary Examiner* — Benjamin Lamont
(74) *Attorney, Agent, or Firm* — Renner, Otto, Boisselle & Sklar, LLP

(57) ABSTRACT

A message is received via a time-synchronized communication channel implemented on a radio link of a cellular network from a terminal. The message includes data associated with the service implemented by the terminal and a node of the cellular network. The message has been transmitted by the terminal at a first point in time. A timeout point in time of communication associated with the service is determined based on the first point in time.

18 Claims, 9 Drawing Sheets

(56) References Cited

U.S. PATENT DOCUMENTS

| | | | |
|---|---|---|---|
| 2013/0297774 A1* | 11/2013 | Pope | H04L 47/286 |
| | | | 709/224 |
| 2014/0192825 A1* | 7/2014 | Wang | H04L 49/55 |
| | | | 370/475 |
| 2015/0071281 A1* | 3/2015 | Shiotani | H04L 47/28 |
| | | | 370/350 |
| 2015/0071309 A1* | 3/2015 | Aweya | H04J 3/0682 |
| | | | 370/503 |

\* cited by examiner

US 9,980,238 B2

TIMEOUT OF COMMUNICATION RADIO LINK

This application is a Continuation of International Application No. PCT/EP2015/076561 filed on Nov. 13, 2015 and herein incorporated by reference in its entirety.

TECHNICAL FIELD

Various embodiments relate to a node of a cellular network and to a corresponding method. In particular, various embodiments relate to techniques of determining a timeout point in time of communication associated with a service implemented by a terminal and the cellular network.

BACKGROUND

Mobile communication is an integral part of modern life. Various services are offered and provided to a user via cellular networks. Services may provide payload data for certain applications executed by a terminal of the user.

Typically, various quality of service (QoS) parameters are associated with services implemented by a corresponding terminal of the user and the cellular network. One particular type of QoS parameter is latency. Typically, latency denotes a delay between triggering a certain action associated with the service and actual execution of the action. E.g., latency can denote the delay between requesting certain data and receiving the requested data.

Modern cellular networks strive to reduce latency associated with certain services. QoS latency requirements can be as low as 1 to 10 milliseconds. E.g., low-latency services can be employed in e.g. remote controlled services over cellular networks, vehicle-to-vehicle communication or machine-type communication (MTC), but can also be a general building block for new types of services requiring short communication delays both in the radio access network (radio access network, RAN latency), as well as complete end-to-end delay (system latency).

Challenges may arise where low-latency requirements are combined with large amounts of traffic to be communicated via radio links of cellular networks. In particular, the combination of increased traffic load and decreased latency is expected to cause challenging design implications on future communication systems.

SUMMARY

Therefore, a need exists for advanced techniques of implementing low-latency communication via a radio link of a cellular network.

This need is met by the features of the independent claims. The dependent claims define embodiments.

According to an embodiment, a node of a cellular network is provided. The node comprises an interface configured to communicate with a terminal on a time-synchronized communication channel. The communication channel is implemented on a radio link of the cellular network. The node further comprises at least one processor configured to receive, via the interface from the terminal, a message. The message includes data associated with the service. The service is implemented by the terminal and the node. The message has been transmitted by the terminal on the channel at a first point in time. The at least one processor is configured to determine a timeout point in time of communication associated with the service based on the first point in time.

According to an embodiment, a method is provided. The method comprises receiving a message including data associated with the service. The message is received from a terminal attached to the cellular network via a time-synchronized communication channel. The time-synchronized communication channel is implemented on a radio link of the cellular network. The service is implemented by the terminal and a node of the cellular network. The message has been transmitted by the terminal on the channel at a first point in time. The method further comprises determining a timeout point in time of communication associated with the service based on the first point in time.

According to an embodiment, a computer program product is provided. The computer program product comprises program code that may be executed by at least one processor. Executing of the program code causes the at least one processor to execute a method. The method comprises receiving a message including data associated with the service. The message is received from a terminal attached to the cellular network via a time-synchronized communication channel. The time-synchronized communication channel is implemented on a radio link of the cellular network. The service is implemented by the terminal and a node of the cellular network. The message has been transmitted by the terminal on the channel at a first point in time. The method further comprises determining a timeout point in time of communication associated with the service based on the first point in time.

According to an embodiment, a terminal is provided. The terminal comprises an interface configured to communicate with a node of a cellular network on a time-synchronized communication channel implemented on a radio link of the cellular network. The terminal further comprises at least one processor. The at least one processor is configured to receive a notification message including an Acknowledgment Repeat Request protocol sequence number of discarded data. The at least one processor is configured to mark the discarded data as discarded in response to receiving the notification message.

E.g., the notification message may be received after transmitting, via the interface, further data prompting the discarded data.

E.g., the notification message may be received after expiry of a timeout point in time associated with the further data prompting the discarded data.

E.g., marking the discarded data as discarded may enable to skip holes in the Acknowledgment Repeat Request protocol sequence number space.

According to an embodiment, a method is provided. The method comprises receiving, from a node of a cellular network on a time-synchronized communication channel implemented on a radio link of the cellular network, a notification message. The notification message includes an Acknowledgment Repeat Request protocol sequence number of discarded data. The method further comprises marking the discarded data as discarded in response to receiving the notification message.

According to an embodiment, a computer program product is provided. The computer program product comprises program code that may be executed by at least one processor. Executing of the program code causes the at least one processor to execute a method. The method comprises receiving, from a node of a cellular network on a time-synchronized communication channel implemented on a radio link of the cellular network, a notification message. The notification message includes an Acknowledgment Repeat Request protocol sequence number of discarded data. The method further comprises marking the discarded data as discarded in response to receiving the notification message.

According to an embodiment, a node of a cellular network is provided. The node comprises an interface configured to communicate with a further node of the cellular network. The node further comprises at least one processor configured to receive, via the interface from the further node, a message included data associated with a service implemented by a terminal attached to the cellular network and the node. The at least one processor is configured to determine a timeout point in time of communication associated with the service in response to receiving the message.

According to an embodiment, a method is provided. The method comprises receiving, at a node of a cellular network from a further node of the cellular network, a message. The message includes data associated with the service implemented by a terminal attached to the cellular network and the node. The method further comprises determining a timeout point in time of communication associated with the service in response to receiving the message.

According to an embodiment, a computer program product is provided. The computer program product comprises program code that may be executed by at least one processor. Executing of the program code causes the at least one processor to execute a method. The method comprises receiving, at a node of a cellular network from a further node of the cellular network, a message. The message includes data associated with the service implemented by a terminal attached to the cellular network and the node. The method further comprises determining a timeout point in time of communication associated with the service in response to receiving the message.

E.g., the node and/or the further node may be part of a core of the cellular network. E.g., the further node may be an access point node identified by an access point name, the access point node providing access to a packet data network. E.g., the packet data network may be the Internet.

E.g., in some scenarios, it is possible that the message has been transmitted by the access point node at a first point in time. Then, it is possible to determine the timeout point in time based on the first point in time. In particular, it may be possible to determine the first point in time based on a predefined value. In other examples, it is possible that the further node includes timestamp information in the message such that the node may accurately determine the first point in time from the timestamp information.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
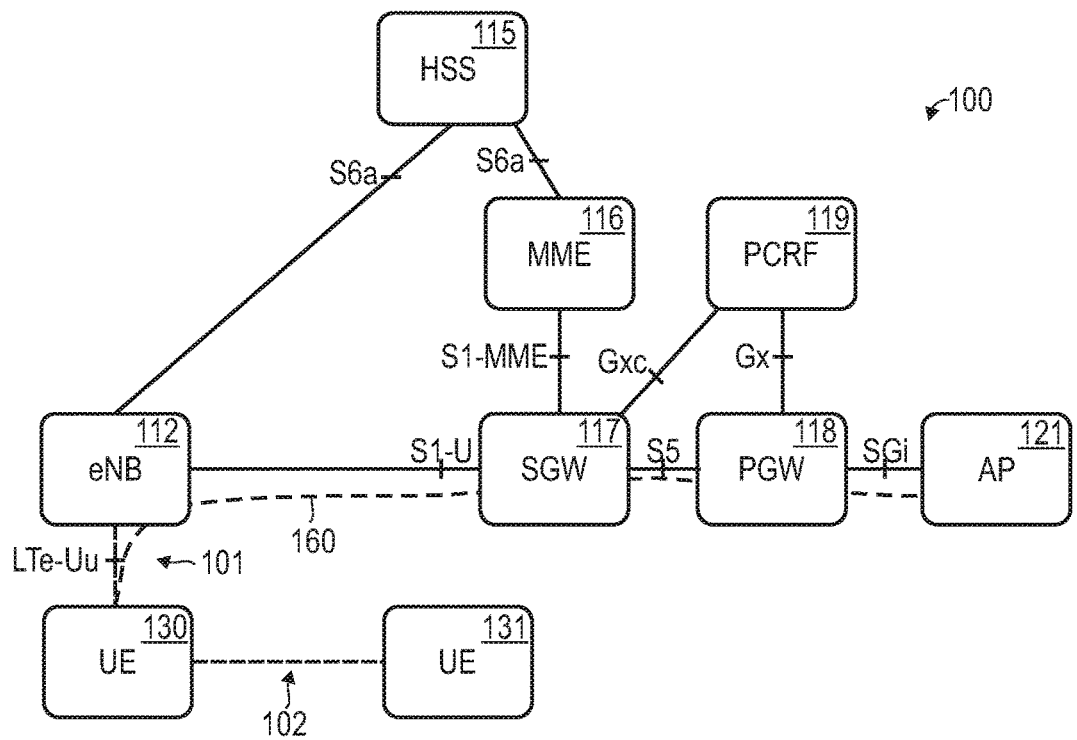
FIG. 1 is a schematic illustration of a cellular network implementing techniques according to various embodiments, wherein a terminal is attached to the cellular network via a communication channel implemented on a radio link of the cellular network.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection.

Functional blocks may be implemented in hardware, firmware, software, or a combination thereof.

Hereinafter, techniques of determining a timeout point in time of communication associated with a service are illustrated. The service is implemented by a cellular network and a terminal, wherein the terminal is attached to the cellular network via a radio link of the cellular network.

E.g., communication of data associated with the service may be implemented via an end-to-end connection between the terminal and access point node enabling access to a packet data network. E.g., the end-to-end connection may be implemented via one or more logical links, sometimes referred to as bearers, of the cellular network. Techniques disclosed herein may be applied to various kinds and types of services. E.g., some services may be MTC-related services, e.g., in the Internet of Things (IoT) domain. Other services may correspond to end-user services, such as music or video streaming, etc.

The timeout point in time is determined based on a first point in time at which a message including data associated with the service has been transmitted by the terminal, e.g., via a payload section of the communication channel of the communication channel of the radio link. E.g., the timeout point in time may be determined by an access point node or a gateway node of a core of the cellular network.

It is then possible to monitor or the timeout point in time. E.g., a corresponding timer may be implemented. In further examples, alternatively or additionally, timestamp information may be included in messages associated with the given service. Based on such techniques, it is possible to take appropriate actions to ensure low-latency delivery of data associated with the given service.

Based on techniques as disclosed herein, it becomes possible to mitigate design challenges imposed by low-latency QoS requirements on the one hand side, and, on the other hand side, increasing amount of data/traffic on the radio link.

FIG. 1 illustrates the architecture of a cellular network 100 according to some examples implementations. In particular, the cellular network 100 according to the example of FIG. 1 implements the Third Generation Partnership Project (3GPP) Long Term Evolution (LTE) architecture, sometimes referred to as evolved packet system (EPS). This, however, is for exemplary purposes only. In particular, various scenarios will be explained in the context of a radio link 101 between a terminal 130 and the cellular network 100 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EG-PRS), Universal Mobile Telecommunications System (UMTS), and High Speed Packet Access (HSPA), and corresponding architectures of associated cellular networks.

The 3GPP LTE RAT implements a Hybrid Automatic Repeat Request (HARQ) protocol on a physical layer. The HARQ protects data communicated via the radio link 101.

The terminal 130 is connected via the radio link 101 with an access point node 112 of the cellular network 100. The access point node 112 and the terminal 130 implement the evolved UMTS terrestrial radio access technology (E-UTRAN); therefore, the access point node 112 is labeled evolved Node B (eNB) 112.

E.g., the terminal 130 may be selected from the group comprising: a smartphone; a cellular phone; a table; a notebook; a computer; a smart TV; a MTC device, etc.

An MTC device is typically a device with a low to moderate requirement on data traffic volumes and loose latency requirements. Additionally, communication employing MTC devices should achieve low complexity and low costs. Further, energy consumption of an MTC device should be comparably low in order to allow battery-powered devices to function for a comparably long duration: The battery life should be sufficiently long.

Communication on the radio link 101 can be in uplink (UL) and/or downlink (DL) direction. The terminal 130 can also communicate with the further terminal 131 via a device-to-device (D2D) radio link 102.

Figure 2A:
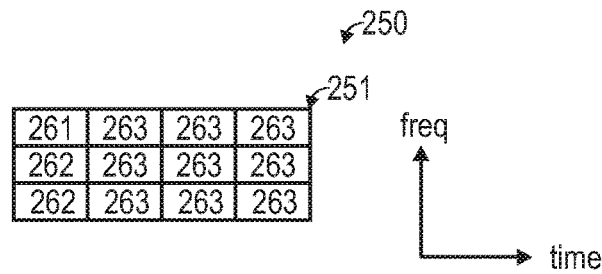
FIG. 2A illustrates various resource blocks on the communication channel, the resource blocks being dedicated to various sections of the communication channel.

Details of the radio link 101 are illustrated in FIG. 2A. The radio link 101 implements a time-synchronized communication channel 250. A single transmission frame 251 of the time-synchronized communication channel 250 is illustrated in FIG. 2A as an example. The transmission slots 251 are synchronized and scheduled. The transmission frames 251 comprises a plurality of resource blocks 261-263 which are defined in time-domain and frequency-domain. The resource blocks 261-263 are associated with different sections of the communication channel 250.

E.g., one or more first resource blocks 261 may carry synchronization signals which enable the eNB 112 and the terminal 130 to synchronize communication on the radio link 101 via the communication channel 250 in time-domain. In particular, time-synchronized communication on the communication channel 250 may allow to estimate a latency between transmitting of a message and receiving of the message (time-of-flight duration) via the radio link 101.

Further, the communication channel 250 comprises resource blocks 262 associated with a control section of the communication channel 250. The control section may be used for communicating various messages which configure operation of the terminal 130, the eNB 112, and/or the radio link 101. E.g., radio resource control (RRC) messages can be exchanged via the control section. According to the E-UTRAN RAT, the resource blocks 262 may define a Physical Downlink Control Channel (PDCCH) and/or a Physical Uplink Control Channel (PUCCH).

Further, some resource blocks 263 are associated with a payload section of the communication channel 250 carrying higher-layer user-plane data associated with a given service implemented by the terminal 130 and the eNB 112. According to the E-UTRAN RAT, the resource blocks 263 may define a Physical Downlink Shared Channel (PDSCH) or a Physical Uplink Shared Channel (PUSCH).

Turning again to FIG. 1, the eNB 112 is connected with a gateway node implemented by a serving Gateway (SGW) 117. The SGW 117 may route and forward payload data and may act as a mobility anchor during handovers of the terminal 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the terminal 130 to seek access to the packet data network.

The PGW 118 can be an endpoint of an end-to-end connection 160 for packetized payload data of the terminal 130. The end-to-end connection 160 may be used for communicating data of a particular service. Different services may use different end-to-end connections 160 or may share, at least partly, a certain end-to-end connection.

Figure 2B:
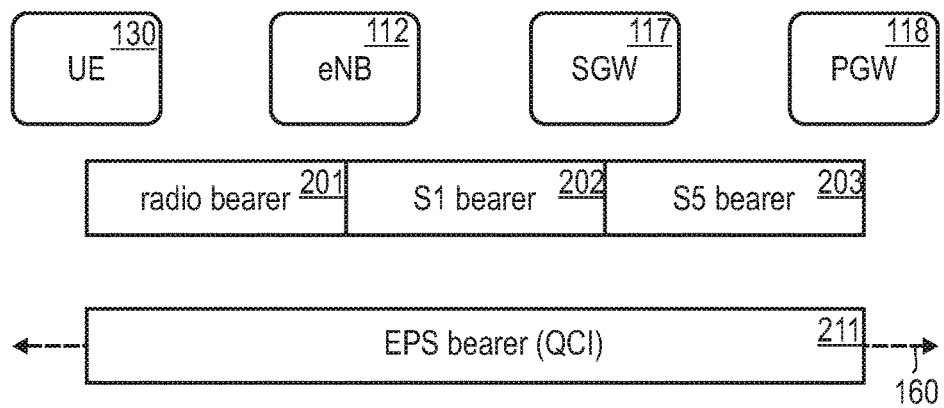
FIG. 2B illustrates bearers implemented on the radio link of the cellular network of FIG. 1, the bearers providing communication associated with a service implemented of the terminal and the cellular network.

The end-to-end connection 160 may be implemented by one or more bearers (see FIG. 2B) which are used to communicate service-specific data. As can be seen in FIG. 2B, an EPS bearer which is characterized by a certain set of quality of service parameters indicated by the QoS class identifier (QCI), comprises a plurality of sub-bearers 201-203 implemented in-between the terminal 130, the eNB 112, the SGW 117, and the PGW 118, respectively. Each bearer 211, 201-203 may be associated with a bearer identification and/or IP addresses of the corresponding endpoints 112, 117, 118, 130. E.g., the QCI may be indicative of a latency requirement associated with a service implemented by the bearers 211, 201-203. The QCI classes are defined by 3GPP Technical Specification (TS) 23.203 V13.5.1 (2015). Secure communication may be enabled by implementing tunnels on the bearers 201-203, 211.

Figure 3:
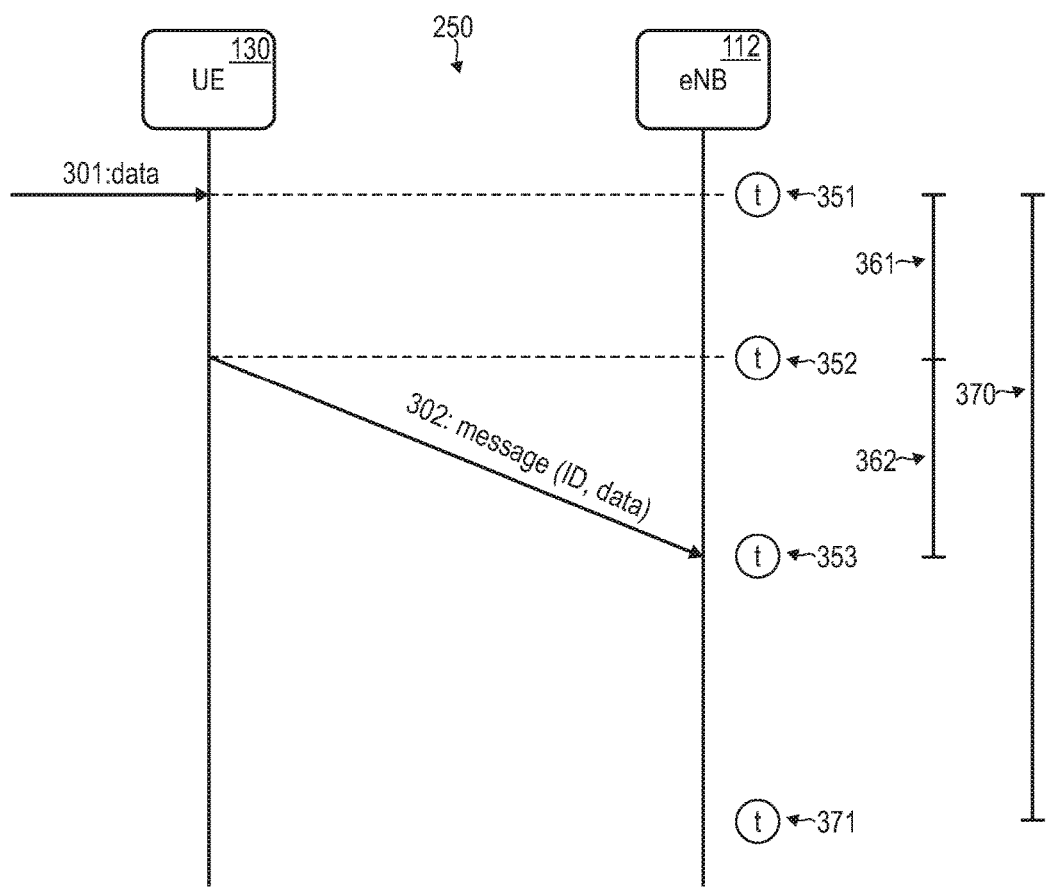
FIG. 3 is a signaling diagram illustrating aspects of determining a timeout point in time of communication associated with the service based on a first point in time at which a message has been transmitted by the terminal, the message including data associated with the service.

Now turning to FIG. 3, aspects of determining a timeout point in time 371 of communication associated with the service are illustrated. FIG. 3 illustrates UL communication of data 301. The data 301 is associated with a given service. The data 301 is thus transmitted via an appropriate end-to-end connection 160 and/or via an appropriate bearer 211, 201-203.

The timeout point in time 371 is determined on the network-side of the cellular network 100 based on a point in time 352 at which a message 302 including the data 301 associated with the service 160 has been transmitted by the terminal 130 on the channel 250.

The message 302 may be a data packet including the data 301. The message 302 may correspond to the transmission frame 251 at which the data 301 has been transmitted. The message 302 may correspond to a packet data unit or service data unit of a certain layer of a protocol stack of the communication channel 250. The message 302 may correspond to a transmission block of the respective end-to-end connection 160 and/or the respective bearer 211, 201-203.

As can be seen from FIG. 3, the message 302 requires a certain time-of-flight duration 362 in-flight on the communication channel 250 in-between the terminal 130 and the eNB 112. This time duration 362 adds to the overall latency of the service 160. Because the communication channel 250 is time-synchronized, it becomes possible for the eNB 112 to take into account the time duration 362, i.e., to estimate the point in time 352 at which the message 302 has been transmitted by the terminal 130. Thus, to determine the point in time 352, the synchronization symbols communicated via the resource blocks 361 of the communication channel 250 may be taken into account. Where the time-of-flight delay is considered, it becomes possible to accurately determine the timeout point in time 371.

Sometimes, an even higher accuracy in determining the timeout point in time 371 may be desired. Here, it is also possible to take into account, when determining the timeout point in time 371, a point in time 351 at which the data 301 has arrived at an upper layer of a transmitter protocol stack of the channel 250 implemented by the terminal 130. E.g., the upper layer may be one of an application layer, a network layer, a medium access control (MAC) layer, etc. I.e., the latency induced by a time duration 361 required for transmitter-side processing of the data 301 can be taken into account.

Various techniques are conceivable to determine the point in time 351. In some scenarios, it is possible that the terminal 130 adds timestamp information indicative of the point in time 351 to the message 302. Then, it becomes possible to determine the point in time 351 and the time duration 361 at a high accuracy at the cost of additional overhead. In other examples, it is possible to determine the point in time 351 based on a predefined value. The predefined value may be an estimate for the processing delay corresponding to the time duration 361. E.g., the predefined value may be pre-negotiated between the terminal 130 and the eNB 112 and/or may be based on historical data collected by the cellular network 100 for the terminal 130.

Thus, as can be seen from FIG. 3, based on techniques disclosed herein, it becomes possible to estimate the delay experienced by the data 301 due to processing at the terminal 130 and/or due to communication on the communication channel 250. Thus, when receiving the message 302 at the point in time 353, the eNB 112 or another network node of the cellular network 100 can make a well-informed decision on how long the data 301 has already been underway. This can be used in order to accurately determine the timeout point in time 371 of communication associated with the service 160.

E.g., the timeout point in time 371 may be determined based on a latency parameter of a QoS requirement associated with the service. E.g., the latency parameter can be compared with the time duration 361, 362 which indicates how long the data 301 already has been underway to determine the timeout point in time 371.

Various actions may be taken if at the determined timeout point in time 371 a timeout is detected. These actions may influence the service with which the data is associated. E.g., operation parameters of the end-to-end connection 160 associated with the service, respectively of one of the bearers 211, 201-203 may be set. E.g., one or more QoS parameters may be re-negotiated. E.g., one or more latency-belated QoS parameters may be re-negotiated. E.g., depending on the kind and type of the service 160 and/or depending on the kind and type or content of the data 301, different actions may be taken at the timeout point in time 371. E.g., in some scenarios, the data 301 itself may be discarded by the eNB 112, e.g., if the eNB 112 attempts to deliver the data 301 to a further node or terminal (not shown in FIG. 3). In still other embodiments, it is possible to discard further data which has been requested by the data 301 and which is also associated with the service 160.

Figure 4:
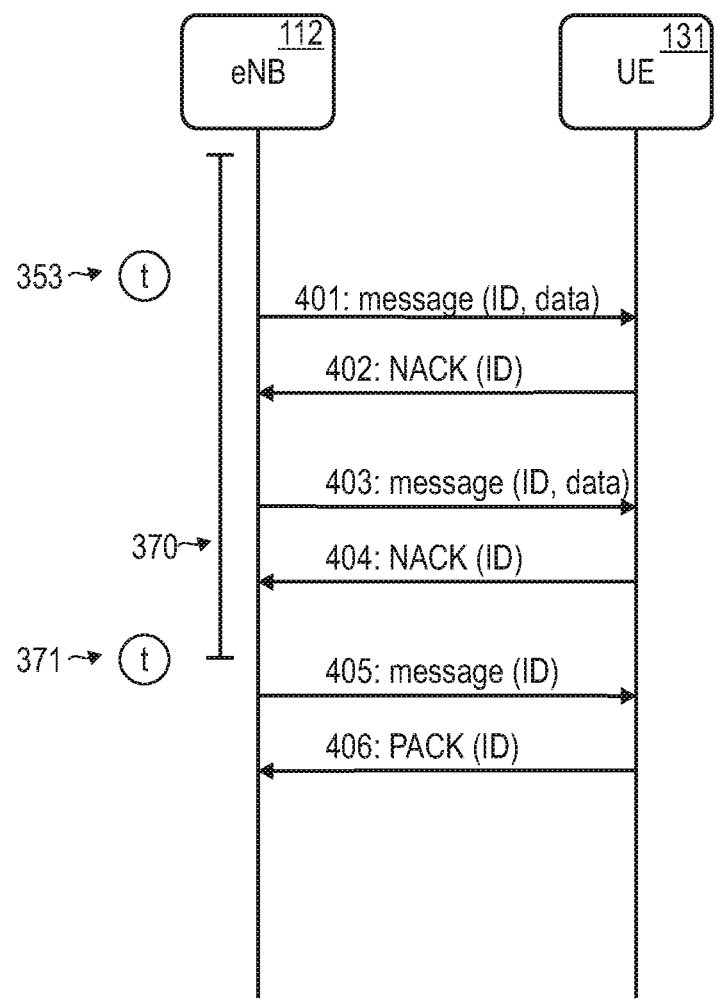
FIG. 4 is a signaling diagram illustrating aspects of monitoring timeout of communication associated with the service based on the determined timeout point in time of FIG. 3 according to various embodiments.

Turning to FIG. 4, a scenario is shown where the data 301 is discarded upon expiry of the timeout point in time 371; expiry of the timeout point in time 371 may be monitored, e.g., based on a discard timer 370. In particular, in the scenario of FIG. 4, the eNB 112 implements a discard timer 370 which is initialized such that it expires at the timeout point in time 371. The eNB 112 seeks to send further messages 401, 403 including the data 301 to a further terminal 131; the messages 401, 403 are labeled with a sequence number of an Automatic Repeat Request (ARQ) protocol protecting communication between the eNB 112 and the further terminal 131. E.g., the ARQ protocol in the example of FIG. 4 may be implemented by a physical layer or a Medium Access Control layer of a protocol stack of the communication channel 250. In other examples, the ARQ protocol may be implemented by a higher layer of the protocol stack, e.g., an application layer.

The messages 401, 403 are not successfully delivered and the eNB 112 receives negative acknowledgments 402, 404 for the messages 401, 403, again identified by the sequence number of the ARQ protocol.

After receipt of the negative acknowledgment 404, the discard timer 370 expires as the timeout point in time 371 has been reached. A timeout of the data 301 is detected, because up to the timeout point in time the data 301 couldn't be delivered to the further terminal 131. In response to discarding the data 301, the eNB 112 sends a message 405. The message 405 includes the ARQ protocol sequence number associated with the data 301, but does not include the data 301 itself. As such, the message 405 may be labeled notification message: it informs the further terminal 131 about discarding of the data 301. Thus, the further message 405 may mark the data 301 as discarded.

Because the message 405 only includes the ARQ protocol sequence number associated with the data 301—but does not include the data 301 itself—the terminal 131 is implicitly informed about discarding of the data 301 in response to the timeout point in time 371 having been reached. In one example, the notification message 405 may be communicated on resource blocks 263 associated with a payload section of the communication channel 250. Thereby, legacy operation of the ARQ protocol may be facilitated. In particular, gaps in the ARQ sequence number space due to discarding may be skipped by the receiver, i.e., in the example of FIG. 4 the further terminal 131 once the data 301 has been marked as discarded.

Because the data 301 has been removed from the message 405, the message 405 is much smaller if compared to the messages 401, 403 such that a likelihood of successful communication of the message 405 from the eNB 112 to the further terminal 131 is comparably large. As can be seen from FIG. 4, the eNB 112—in response to sending the message 405—receives a positive acknowledgment 406 including the ARQ protocol sequence number of the data 301. The positive acknowledgment 406 acknowledges that the message 405 has been correctly received by the terminal 131. Thus, the further terminal 131 is aware of the discarding of the data 301.

E.g., a scenario as illustrated with respect to FIG. 4 may occur in a scenario where the D2D radio link 102 between the terminal 130 and the further terminal 131 is broken and the data 301 needs to be rerouted via the eNB 112. As will be appreciated from the description of FIG. 4 disclosed above, in the scenario of FIG. 4 the data 301 itself is discarded. E.g., the data 301 may be flushed from a transmit buffer of the eNB 112. However, in other scenarios, further data can be discarded—the further data may be requested by the data 301.

Figure 5:
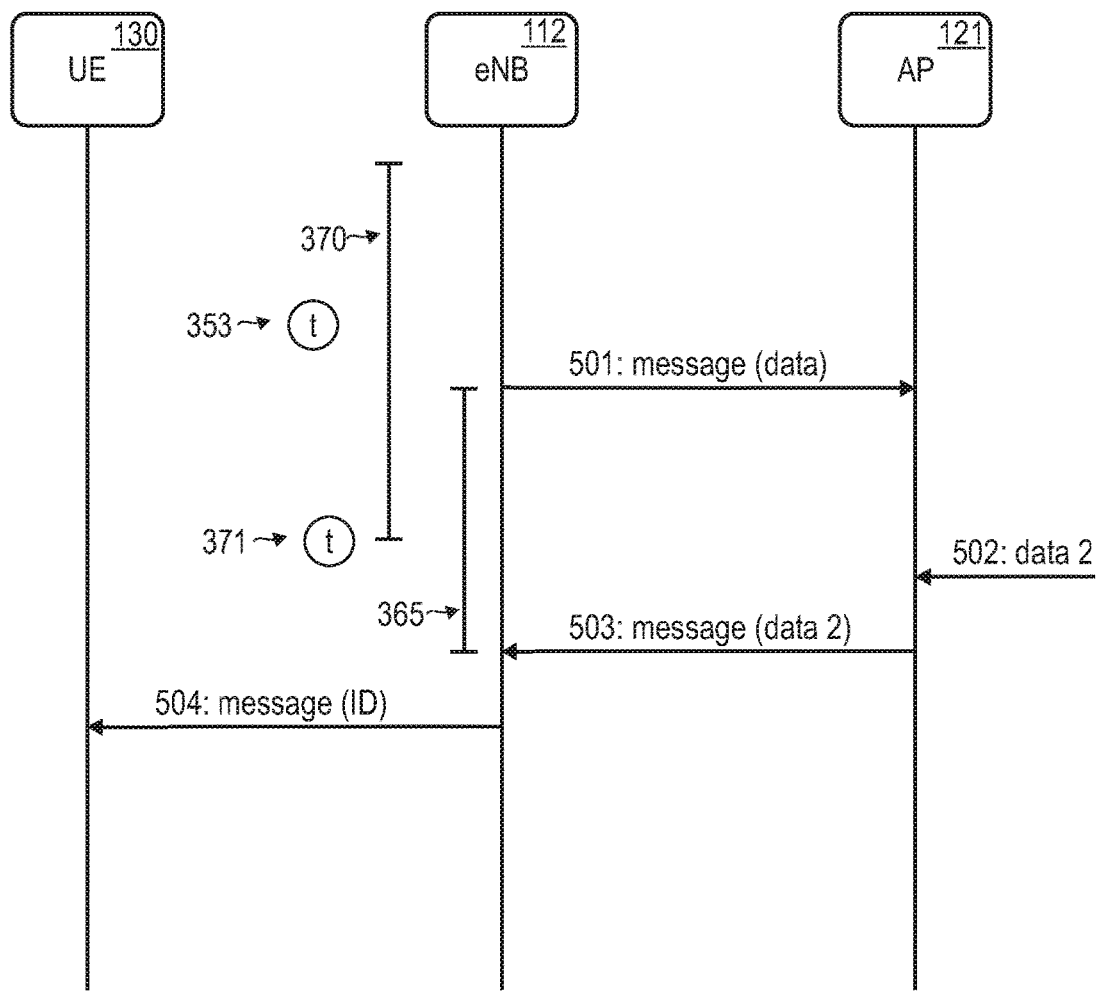
FIG. 5 is a signaling diagram illustrating aspects of monitoring timeout of communication associated with the service based on the determined timeout point in time of FIG. 3 according to various embodiments.

FIG. 5 illustrates a scenario where the eNB 112, in response to receiving the message 302 (see FIG. 3), sends a further message 501 to the access point node 121, the further message 501 including the data. In the example of FIG. 5, the data 301 prompts/requests further data 502 from the PDN to which access is granted by the access point node 121. The further data 502 is received after a certain time duration 365 by the eNB 112. The time duration 365 adds to the overall latency experienced by the terminal 130 for the service 160.

In particular, in the scenario of FIG. 5, the time duration 365 is comparably long such that the message 503 including the further data 502 only is received by the eNB 112 after expiry of the discard timer 370, i.e., after the timeout point in time 371. Because of this, the further data 502 is discarded by the eNB 112.

FIG. 5 also illustrates aspects of informing the terminal 130 about discarding the further data 502. In particular, a notification message 504 is sent by the eNB 112 to the terminal 130, the notification message 504 including a sequence number of an ARQ protocol which protects data associated with the service. In particular, in the scenario of FIG. 5, the ARQ protocol may be implemented by a higher layer of a protocol stack of the communication channel 250 such as an application layer associated with the service. E.g., the ARQ protocol may be a TCP/IP ARQ protocol.

Figure 6:
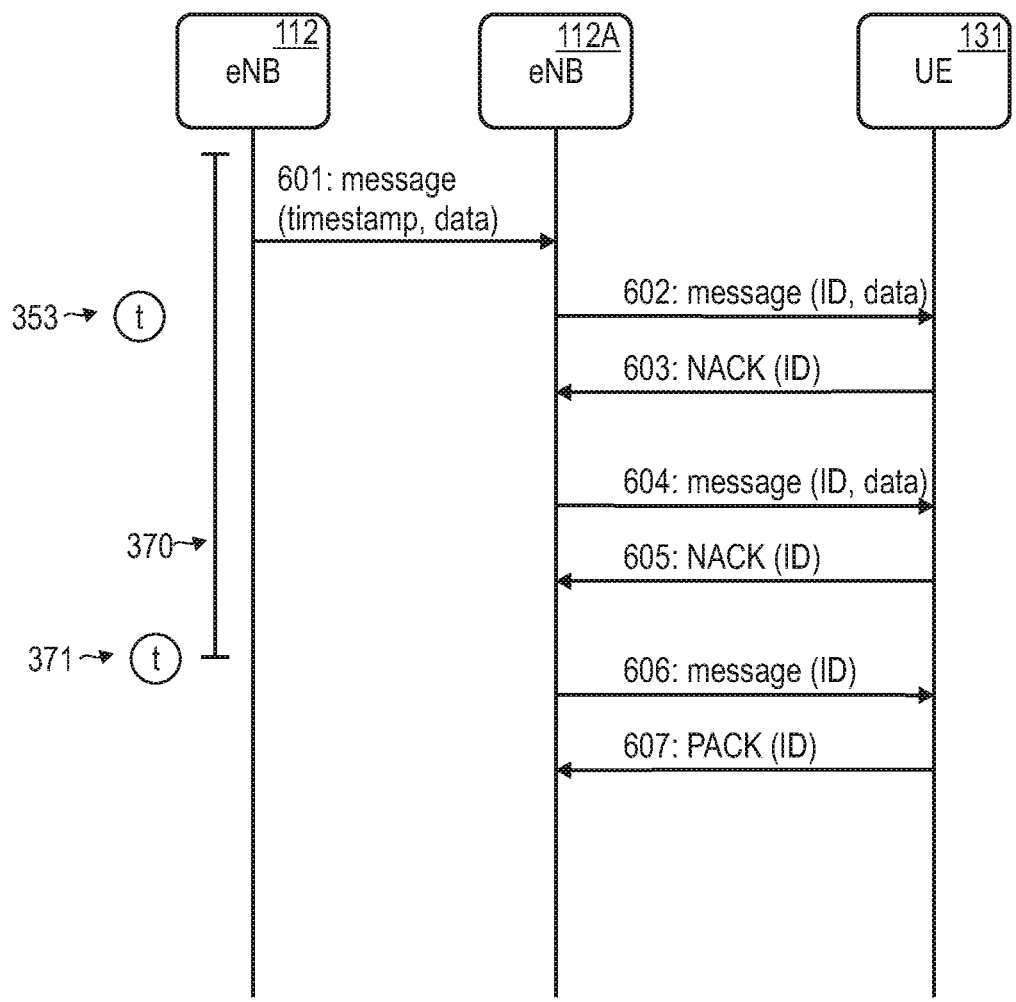
FIG. 6 is a signaling diagram illustrating aspects of monitoring timeout of communication associated with the service based on the determined timeout point in time of FIG. 3 according to various embodiments.

As will be appreciated, with respect to FIGS. 4 and 5, scenarios have been illustrated where the eNB 112 implementing the communication channel 250 with the terminal 130 is configured to monitor or the timeout point in time 371 and to selectively discard data associated with the service if a timeout is detected. However, in other examples, logic for monitoring the timeout point in time 371 does not reside at the eNB 112. E.g., in some scenarios, corresponding logic may reside at the SGW 117. Further, illustrated with respect to FIG. 6 is a scenario where corresponding logic of monitoring the timeout point in time 371 resides at a further eNB 112A of the cellular network 100. Here, the eNB 112 adds timestamp information indicative of the timeout point in time 371 to a message 601 which also includes the data 301. E.g., the further message 601 may be communicated to the further eNB 112A in order to facilitate delivery of the data 301 to a further terminal 131 (not shown in FIG. 6) attached to the cellular network 100 via the further eNB 112A.

E.g., a respective attribute may be reserved in a header of the message 601 for the timestamp information. Then, the eNB 112 transmits the further message 601 to the further eNB 112A. 602-607 generally correspond to 401-406.

Figure 7:
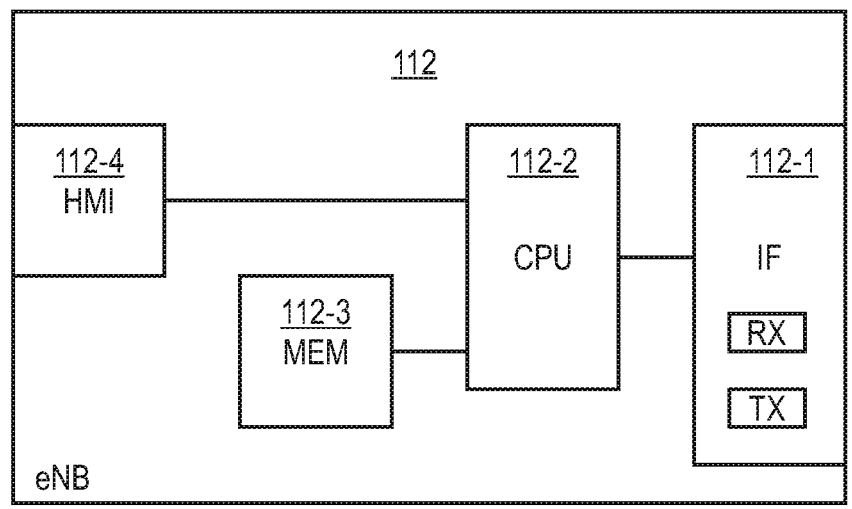
FIG. 7 is a schematic illustration of an access point node implementing techniques according to various embodiments.

In FIG. 7, the eNB 112 is illustrated schematically. The eNB 112 comprises an interface 112-1 comprising an analog front end having a receiver and a transmitter (labeled RX and TX in FIG. 7). The interface 112-1 is configured to communicate with the terminal 130 on the time-synchronized communication channel 250 implemented by the radio link 101 of the cellular network 100. The eNB 112 further comprises a processor 112-2 and a memory 112-3. E.g., the memory 112-3 may be a non-volatile memory. The eNB 112 further comprises a human machine interface 112-4 (HMI). Via the HMI 112-4, commands may be input from a user and/or may be output to the user. The memory 112-3 may store control instructions that may be executed by the processor 112-2. Executing the control instructions may cause the processor 112-2 to execute techniques as illustrated herein, e.g., with respect to determining the timeout point in time 371, monitoring the timeout point in time 371, e.g., by implementing a corresponding discard timer, adding timestamp information indicative of the timeout point in time 371 to a further message, determining the point in time 351, 352 etc.

Figure 8:
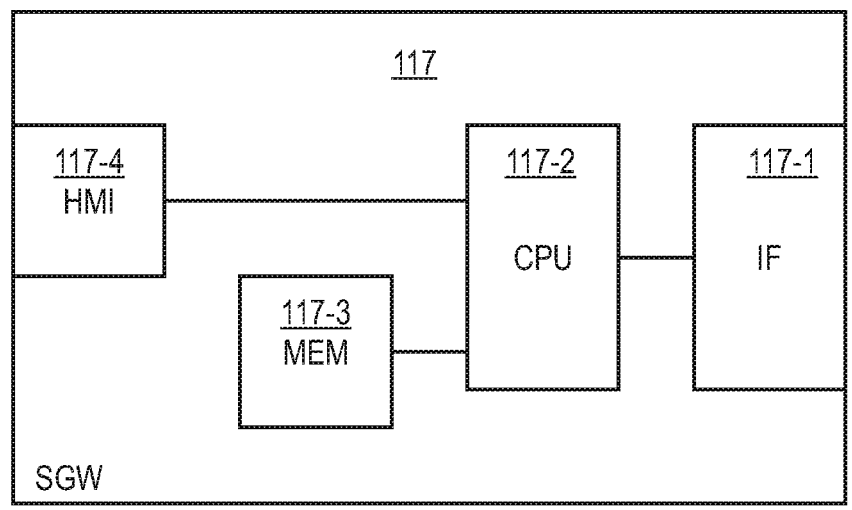
FIG. 8 is a schematic illustration of a gateway node implementing techniques according to various embodiments.

In FIG. 8, the SGW 117 is illustrated schematically. The SGW 117 comprises an interface 117-1. The interface 117-1 is configured to communicate with the eNB 112 and with the PGW 118. The SGW 117 further comprises a processor 117-2 and a memory 117-3. E.g., the memory 117-3 may be a non-volatile memory. The SGW 117 further comprises an HMI 117-4. Via the HMI 117-4, commands may be input from a user and/or may be output to the user. The memory 117-3 may store control instructions that may be executed by the processor 117-2. Executing the control instructions may cause the processor 117-2 to execute techniques as illustrated herein, e.g., with respect to determining the timeout point in time 371, monitoring the timeout point in time 371, e.g., by implementing a corresponding discard timer, adding timestamp information indicative of the timeout point in time 371 to a further message, determining the point in time 351, 352 etc.

Figure 9:
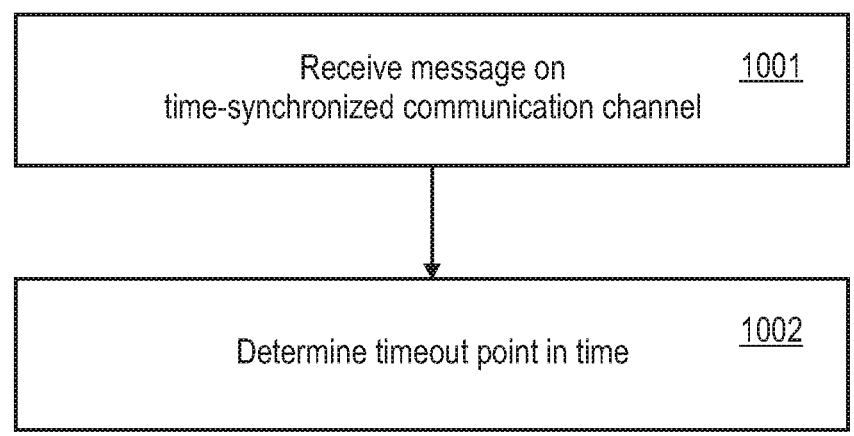
FIG. 9 is a flowchart of a method according to various embodiments.

FIG. 9 illustrates a method that may be executed by one of the processors 112-2, 117-2 of the eNB 112 and the SGW 117, respectively, e.g., when executing control instructions stored in the corresponding memories 112-3, 117-3. First, a message is received via the time-synchronized communication channel 250, 1001. The message includes data associated with the respective service. Next, the timeout point in time 371 is determined, 1002. When determining the timeout point in time at 1002, it is possible to take into account a point in time 352 at which the message received at 1001 has been transmitted by the corresponding terminal 130. Optionally, when determining the timeout point in time at 1002, it is possible to take into account a synchronization signal communicated on the communication channel 250 and respective resource blocks 261 in order to achieve implementation of the communication channel 250 in the time-synchronized manner. Alternatively or additionally, the timeout point in time can be determined taking into account a point in time 351 corresponding to arrival of the data included in the message at an upper layer of a transmitter protocol stack of the communication channel 250.

Figure 10:
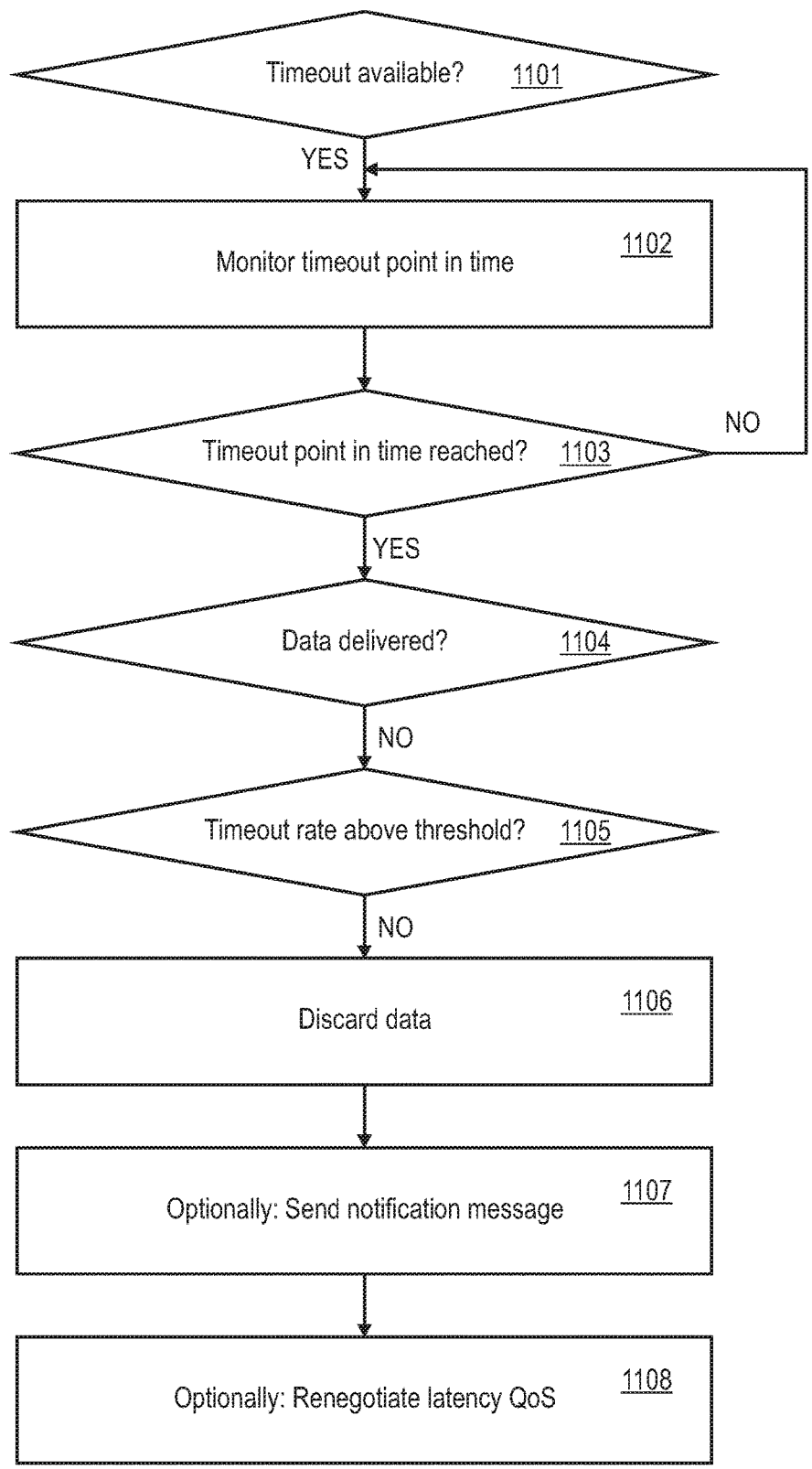
FIG. 10 is a flowchart of a method according to various embodiments.

FIG. 10 illustrates a method that may be executed, e.g., by one of the processors 112-2, 117-2 after determining the timeout point in time 371. First, it is checked whether a timeout is generally available for the service associated with the data for which the timeout point in time 371 has been determined, 1101. E.g., availability of the timeout may be specified by a respective QoS parameter associated, e.g., with the respective end-to-end communication 160/the respective bearer 211, 201-203 associated with the service. This QoS parameter may be referred to as "waste parameter", because it can be utilized by latency sensitive services to indicate that if data is not delivered in time it may be discarded and does not need to be transferred through the system anymore. By means of the "waste parameter", low-latency QoS classes can be relaxed in expectations regarding data delivery probability.

E.g., timeout may be generally available for a service where in-time delivery of data is more important than loss-free delivery of data. E.g., certain services may tolerate a certain discard rate of data in order to enable low latency for successfully delivered data. Examples services may include: voice communication; video streaming; MTC communication; best-effort traffic; etc. For other services, the timeout may not be available. E.g., services which require full delivery of data may comprise email, Internet, etc.

If, at 1101, it is determined that a timeout of communication associated with the respective service is generally available, the method commences at 1102 with monitoring the timeout point in time 371. Monitoring can comprise repeatedly checking, e.g., at fixed intervals or otherwise triggered or clocked, whether a current time is equal or larger than the timeout point in time 371. At 1103, it is checked whether the timeout point in time 371 has already been reached. If this is the case, at 1104, it is checked whether data associated with the timeout point in time 371 has been successfully delivered or not. For this, at 1104, it may be checked for positive acknowledgments of an ARQ protocol implemented, e.g., by an application layer of the service and/or a physical layer of the communication channel 250.

If at 1104 is judged that the corresponding data has not been delivered successfully (timeout detected), at 1105 it is checked whether a certain timeout rate associated with the service is above a threshold. 1105 is an optional step. Where the action taken in response to a timeout is discarding data, the timeout rate may relate to a discard rate of discarding data associated with the service.

The timeout rate may be determined based on monitoring the timeout point in time at 1102 for various data associated with a given service. The threshold for comparison with the timeout rate may be service-specific. The threshold for comparison with the timeout rate may be a QoS parameter associated with the respective service. E.g., each time a timeout is triggered for data associated with the respective service and/or each time data has been successfully delivered, the timeout rate can be updated. E.g., higher (lower) values of the timeout rate can indicate that a larger (smaller) fraction of data associated with the service has not been successfully delivered before expiry of the timeout point in time 371. In this context, the threshold for comparison with the timeout rate may be labelled as "waste probability"; the waste probability may supplement the waste parameter discussed above.

If the timeout rate is not above the threshold, at 1106 the corresponding data is discarded. Discarding data can correspond to at least one of the following: not forwarding the data to further nodes and/or the terminal 130; deleting or flushing the data from a transmit buffer; out-of-sequence processing of further data which had been held back by the data now discarded.

Next, at 1107, a notification message is sent. Sending of the notification message is optional. The notification message informs a receiver about said discarding of the data at 1106. In some scenarios, the notification message can be communicated on a payload section of the communication channel 250; in other examples, the notification message may be sent on a control section of the communication channel 250. Where the notification message is communication on a payload section of the communication channel 250, the respective end-to-end communication 160/bearer 211, 201-203 associated with the service may be employed for delivery.

In particular, the notification message may be stripped of the payload data that has been discarded and retain the respective header, only. The respective header, in particular, may be indicative of a sequence number of an ARQ protocol associated with the data that has been discarded. Depending on the layer to which the data relates, techniques of deep packet inspection (DPI) may be employed. This facilitates marking the corresponding data as discarded at the receiver. Thus, the receiver is aware of the amount of delays and discarded data and, e.g., may initiate re-negotiation of the quality of service parameters where required.

At 1108, optionally, certain QoS parameters—such as the latency QoS parameter—may be renegotiated. Renegotiating of QoS parameters may be helpful where, e.g., the timeout rate is considerably above a tolerable threshold. The tolerable threshold may be specified as a timeout rate parameter of a QoS associated with the end-to-end communication 160 and/or the bearer 211, 201-103 used for communicating data associated with the service. This may indicate that the presently available QoS parameters cannot be maintained for the respective service. Then, renegotiating corresponding QoS parameters may help to increase a quality of user experience. A particular QoS parameter that may be renegotiated is the latency QoS parameter.

While with respect to FIG. 10 a certain sequence of method steps has been discussed, the sequence may be altered in other examples. Further, in other examples various steps may be combined. E.g., the checks at 1101 and 1105 may be combined in other examples.

Summarizing, above techniques of determining a timeout point in time for data associated with the service have been illustrated. In particular, the techniques disclosed above enable nodes of a cellular network to account for delays due to processing at the terminal and/or RAN delays. In some examples, data which is delayed beyond the timeout point in time may be discarded. Hence, with the disclosed technology low-latency QoS classes can be implemented, because successful delivery of all data is not required to be guaranteed.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., albeit various examples have been illustrated with respect to certain logic residing at the eNB, it should be generally understood that corresponding logic may be readily implemented at different nodes of the cellular network, e.g., at the SGW or the PGW.

E.g., albeit various examples have been illustrated where data is discarded in response to the timeout point in time having been reached, in other examples other actions may be taken. E.g., corresponding data may be flagged as timed out, QoS parameters of the corresponding service may be renegotiated, a connection failure of an end-to-end connection associated with the respective service may be triggered, etc.

E.g., various examples have been described where the message triggering determining of the timeout point in time is received via a radio link from a terminal attached to the cellular network. However, respective techniques as disclosed in the various embodiments herein may be readily applied to messages not received from a terminal attached to the cellular network—but from a further node of the cellular network, e.g., from a further node of the core of the cellular network 100. E.g., determining of the timeout point in time may be in response to receiving, at the eNB 112, a message from the SGW, the PGW, or an access point node configured to provide access to a PDN. E.g., the PDN may be the Internet or the Internet protocol multimedia subsystem (IMS) via which services such as voice over LTE may be implemented. The message may include data associated with a service.

Figure 11:
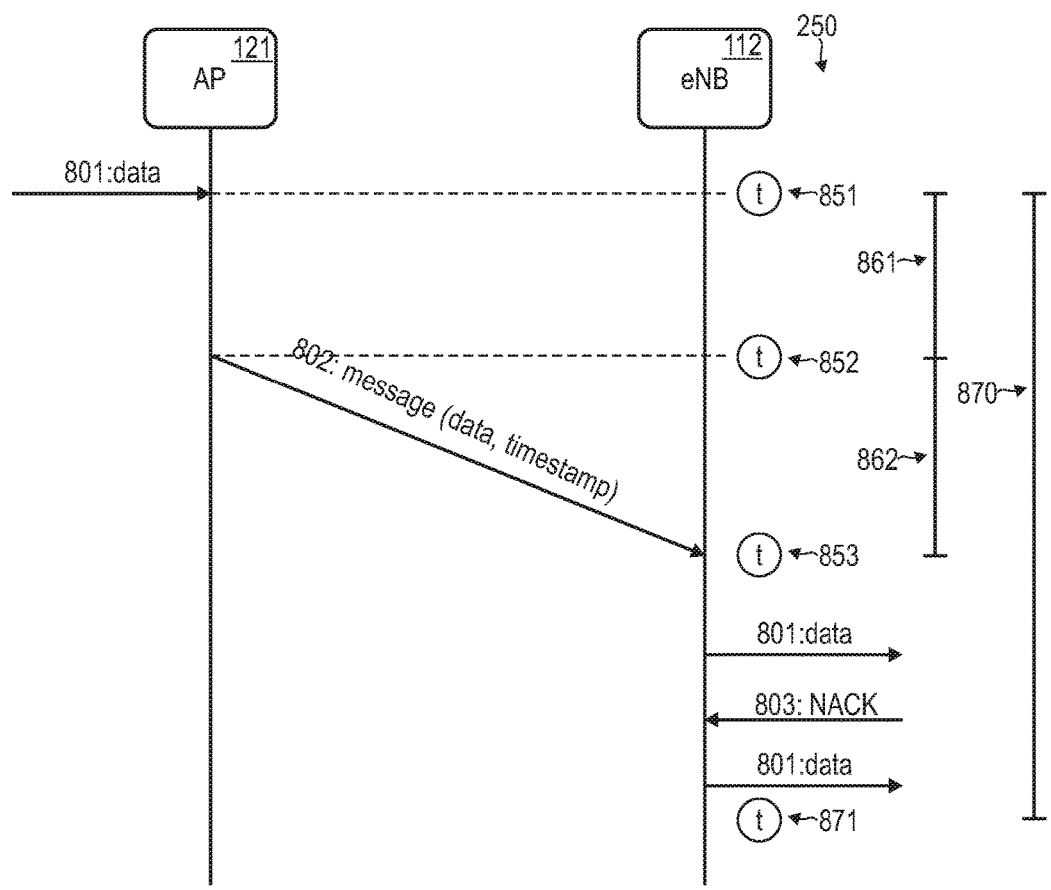
FIG. 11 is a signaling diagram illustrating aspects of determining a timeout point in time of communication associated with the service based on a first point in time at which a message has been transmitted by an access point node, the message including data associated with the service.

A corresponding scenario is disclosed in FIG. 11. FIG. 11 shows that the access point node 121 may receive data 801, e.g., from a PDN such as the Internet (not shown in FIG. 11). The access point node 121 receives the data 801 at a point in time 851 and—after some processing delay 861 at a later point in time 852—forwards a message 802 including the data 801 and timestamp information. The data 801 is received as part of the message 802 at a point in time 853, i.e., is in-flight in between the access point node 121 for a certain time duration 862. E.g., the message 802 may be communicated from the access point node 121 to the eNB 112 by means of a corresponding end-to-end connection 160, 201-203, 211.

The eNB 112 then attempts to send the data 801 on the time-synchronized communication channel 250 implemented on the radio link 101 to the terminal 130 (not shown in FIG. 11). However, the data 801 cannot be delivered to the terminal 130 which may be indicated by negative acknowledgments 803 of an Automatic Repeat Request protocol or lack of any received—positive or negative—acknowledgments.

In response to receiving the message 802, the eNB 112 determines a timeout point in time 871. Here, various techniques as disclosed with respect to various examples in the present application may be applied. E.g., it may be possible to consider a latency parameter of the QoS associated with the service for which the data 801 is communicated. In particular, the timeout point in time 871 can be determined based on at least one of the points in time 851, 852. For this, the timestamp information included in the message 802 may be taken into consideration; alternatively or additionally, the eNB 112 may rely on a predefined value, e.g., for the processing delay 861 or for the in-flight duration 862 between the access point node 121 and the eNB 112. In a scenario where the communication channel between the access point node 121 and the eNB 112 is time-synchronized, the eNB 112 may be configured to determine the point in time 852 based on a corresponding synchronization signal.

The eNB 112 then monitors the timeout point in time 871, e.g., based on a respective timer 870. In particular, the eNB 112 is configured to discard the data 801 based on said monitoring. In detail, once the discard timer 870 has elapsed, the eNB 112 discards the data 801 and does not implement further retransmission attempts. In particular, discarding can be implemented by the various scenarios disclosed herein. Discarding may comprise sending a notification message on a payload section 263 of the communication channel 250. In particular, the notification message may include an Acknowledgment Repeat Request protocol sequence number of the discard of data 801, but may not comprise the discarded data 801 itself.

While with respect to FIG. 11 a scenario has been illustrated, where one and the same data 801 triggers determining of the timeout point in time 871 which is later discarded, other scenarios are conceivable—as explained above—where further data (not shown in FIG. 11) is discarded. E.g., the further data may be prompted by the data 801. E.g., the further data may be received from the terminal 130.

It should be understood that techniques disclosed with respect to FIG. 11 can be readily combined with the various scenarios and techniques as disclosed with respect to FIGS. 1-10.

The invention claimed is:
1. A node of a cellular network, comprising:
an interface configured to communicate with a terminal on a time-synchronized communication channel implemented on a radio link of the cellular network,
at least one processor configured to receive, via the interface from the terminal, a message including data associated with a service implemented by the terminal and the node, the message having been transmitted by the terminal on the channel at a first point in time,
wherein the at least one processor is configured to determine a timeout point in time of communication associated with the service based on the first point in time,
wherein the at least one processor is configured to monitor the timeout point in time,
wherein the at least one processor is configured to re-negotiate a latency parameter of a quality of service associated with the service based on said monitoring,
wherein the at least one processor is configured to determine a timeout rate of communication associated with the service based on said monitoring,
wherein the at least one processor is configured to compare the timeout rate with a timeout rate parameter of the quality of service associated with the service, and
wherein the at least one processor is configured to selectively re-negotiate the latency parameter based on said comparing.
2. The node of claim 1,
wherein the at least one processor is configured to determine the timeout point in time further based on a second point in time corresponding to arrival of the data at an upper layer of a transmitter protocol stack of the channel.
3. The node of claim 2,
wherein the at least one processor is configured to determine the second point in time based on at least one of a predefined value and timestamp information indicative of the second point in time included in the message.
4. The node of claim 1,
wherein the at least one processor is configured to determine the first point in time based on a synchronization signal communicated on the channel.

5. The node of claim 1,
wherein the at least one processor is configured to add timestamp information indicative of the timeout point in time to a further message including the data,
wherein the at least one processor is configured to transmit the further message.

6. The node of claim 1,
wherein the at least one processor is configured to discard the data based on said monitoring.

7. The node of claim 6,
wherein the at least one processor is configured to transmit a notification message including an Acknowledgement Repeat Request protocol sequence number of discarded data, in response to said discarding.

8. The node of claim 7,
wherein the message and the notification message are communicated on a payload section of the channel.

9. The node of claim 6,
wherein the at least one processor is configured to determine a timeout rate of communication associated with the service based on said monitoring,
wherein the at least one processor is configured to selectively execute said discarding based on the timeout rate.

10. The node of claim 9,
wherein the timeout rate comprises a discard rate of discarding data associated with the service in response to a timeout of communication associated with the service.

11. The node of claim 1,
wherein the at least one processor is configured to discard further data associated with the service based on said monitoring.

12. The node of claim 11,
wherein the data prompts the further data.

13. The node of claim 1,
wherein the timeout rate comprises a discard rate of discarding data associated with the service in response to a timeout of communication associated with the service.

14. The node of claim 1,
wherein a timeout parameter of a quality of service associated with the service indicates an availability of timeout of communication associated with the service.

15. The node of claim 1,
wherein the at least one processor is configured to determine the timeout point in time further based on a latency parameter of a quality of service associated with the service.

16. The node of claim 1,
wherein the node is an access point node or a gateway node of a core of the cellular network.

17. A method, comprising:
receiving, from a terminal attached to a cellular network via a time-synchronized communication channel implemented on a radio link of the cellular network, a message, the message including data associated with a service implemented by the terminal and a node of the cellular network, the message having been transmitted by the terminal on the channel at a first point in time,
determining a timeout point in time of communication associated with the service based on the first point in time,
monitoring the timeout point in time,
re-negotiating a latency parameter of a quality of service associated with the service based on said monitoring,
determining a timeout rate of communication associated with the service based on said monitoring,
comparing the timeout rate with a timeout rate parameter of the quality of service associated with the service, and
selectively re-negotiating the latency parameter based on said comparing.

18. The method of claim 17,
wherein the method is executed by the node of claim 1.

* * * * *